Patented May 9, 1939

2,157,295

UNITED STATES PATENT OFFICE 2,157,295

POLYAZO DYESTUFFS AND THEIR MANUFACTURE

Heinrich Lier, Basel, Switzerland, assignor to the firm Chemical Works Formerly Sandoz, Basel, Switzerland No Drawing. Application March 8, 1938, Serial No. 194,705. In Switzerland March 13, 1937

6 Claims. (Cl. 260—171)

I have found that polyazo dyestuffs of good evenness and deep penetration power, which are particularly convenient for dyeing leathers of the most different kinds of tanning can be obtained if they are built up according to the following scheme:

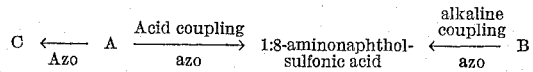

wherein A represents a bivalent radical of the benzene, naphthalene or diphenyl series, B a radical of the benzene or naphthalene series and C the radical of a N-acylaminonaphthol-sulphonic acid or a copulable azo dyestuff from a sulphonated or unsulphonated diazocompound and a N-acylaminonaphtholsulphonic acid.

The new polyazo dyestuffs possess the valuable property of dyeing leathers of the most different kinds of tanning very uniform or level blue to violet shades. The dyeing baths, in spite of the pronounced equalizing power, when having small acid additions, are completely exhausted. The dyeings are insensible to acids or alkalis and show under the action of the light the valuable property of only relatively slightly fading and of not turning to another shade. In this respect they substantially surpass the known dyestuffs which contain as end component C an aminonaphtholsulphonic acid not substituted in the amino group by acid radicals and which in the light strongly turn to green or grey.

If for the building up of the dyestuffs a sulphonated radical is used for the component B the dyestuffs are advantageously usable for the projection or brushing-on or uniform through-dyeing, whereby for example on chrome-velvet leather dyeings are obtained which on subsequent striping off are not cleared up at all or only weakly owing to the obtained excellent through-dyeing. If the radical B does not contain any sulpho groups, dyestuffs are obtained which may be used in cases where especially a superficial dyeing only is required. Thus, the operator has the possibility, by proper substitution of the component B as well as by convenient selection of the number of present sulpho groups in the middle 1:8-aminonaphthol derivative, the bivalent radical A or the end component C, to appropriate the dyestuffs within large limits to any desired application purpose.

For A there may be cited for example diaminodiaryles such as for instance benzidine, diphenyline, o-tolidine, m-tolidine, dianisidine, halogenated benzidines etc. and also mono- or disulphonic acids of benzidines; further there may be used for the building up of the intermediate compound from A and the 1:8-aminonaphtholsulphonic acid the nitranilines or acetaminoanilines, whose nitro- or acetamino groups after the coupling are again reduced to the amino group or saponified, whereupon the resulting aminoazodyestuff is further diazotized, etc. As middle 1:8-aminonaphtholsulphonic acid there may be cited 1:8-aminonaphthol-3:6-disulphonic acid, 1:8-aminonaphthol-4:6-disulphonic acid, 1:8-aminonaphthol-4-sulphonic acid etc. As B there may be used any diazotizable amine, such as for example the aniline, its homologues or the naphthylamines, as well as their derivatives containing halogen-, nitro-, carboxyl-, hydroxyl-, alkoxy-, aryloxy-, amino-, acylamino- or sulpho groups, further diazotizable substituted or unsubstituted monoazodyestuffs.

For C there may be cited N-acylated aminonaphtholsulphonic acids, which on the nitrogen atom may still bear an alkyl- or aralkyl radical, such as for example the N-acetyl-1:8-aminonaphthol-3:6-disulphonic acid, the N-acetyl-1:8-aminonaphthol-4:6-disulphonic acid, the N-acetyl-1:8-ethylaminonaphthol-3:6-disulphonic acid, the N-naphthenoyl-1:8-aminonaphtholsulphonic acids, the N-benzoyl-1:8-aminonaphthol-3:6- or -4:6-di- or -4-sulphonic acid, the N-dichlorobenzoyl- or N-nitrobenzoylaminonaphtholsulphonic acids, the N-benzenesulphoyl- or -toluenesulphoyl-1:8-aminonaphtholsulphonic acids, the N-arylsulphoyl-1:8-aminonaphthol-2:4-disulphonic acids, the N-benzoyl-2-amino-5-naphthol-7-sulphonic acid, the N-toluenesulphoyl-2-amino-5-naphthol-7-sulphonic acid, the N-toluenesulphoyl-2-amino-8-naphthol-6-sulphonic acid, the N-toluenesulphoyl-2-amino-8-naphthol-3:6-disulphonic acid, further the ureae of 1:8-amino-naphtholsulphonic acids, the condensation products from one, two or three molecules of these amino-naphtholsulphonic acids with cyanurtricarbonicacidtrichloride or cyanuric chloride. Further for C there may also be cited couplable monoazodyestuffs from diazotized aminophenols or aminonaphthols or their sulphonic acids and the aforesaid acylated aminonaphtholsulphonic acids.

Instead of the above named N-acylated aminonaphtholsulphonic acids there may also be used the free aminonaphtholsulphonic acids, whereupon the resulting dyestuffs may subsequently be treated with acylating agents such as for example arylsulphochlorides, cyanuric chloride, phosgene etc.

The present invention affords, as may be seen, a great variety in respect of the applicability of the aminonaphthol derivatives as well as in respect of the number and position of the sulpho groups and other substituents. It is therefore not to be limited to the following examples, which only serve to illustrate the invention.

*Example 1*

1 molecule of benzidine is tetrazotized and coupled in weakly mineral acid solution with 1 molecule of 1:8-aminonaphthol-3:6-disulphonic acid. When the formation of the intermediate product is achieved, the same is combined with a soda alkaline solution of about 1 molecule of diazobenzene. After the diazobenzene has disappeared, a caustic alkaline solution of 1 molecule of N-p-toluenesulphoyl-1:8-aminonaphthol-3:6-disulphonic acid is allowed to flow into the reaction mass. The difficultly soluble disazo intermediate compound is soon dissolved. After some time the deep blue coupling liquor is intermixed with hydrochloric acid up to complete neutral reaction and the dyestuff is slowly salted out with common salt at ordinary temperature.

The new dyestuff constitutes after drying a dark, somewhat bronzing powder which easily dissolves in water with a deep blue coloration, which does not substantially change neither on addition of an alkali nor on addition of an acid. Chrome leather and vegetably tanned leather are dyed in deep-blue shades from a weakly formic acid bath. Whilst the dyeing with the corresponding known dyestuff, obtainable according to the German Patent No. 153,557, with the 1:8-aminonaphthol-3:6-disulphonic acid as end component, greatly changes already after a short exposition to light to a dull green, chrome leather dyed with the new dyestuff is only slightly cleared up without falling out of the blue shade range.

If in the manufacture of the dyestuff the benzidine is replaced by meta-tolidine, a dyestuff is obtained which dyes for example chrome leather violet-blue shades which are extraordinarily solid to striping off.

If in the manufacture of the new dyestuff, there is used instead of diazobenzene a corresponding quantity of diazobenzene-p-, -m- or -o-sulphonic acid or diazobenzenedisulphonic acids, dyestuffs of almost the same shade are obtained, which owing to their greater content of sulpho groups are still better soluble and insensible to acids and in many cases are still faster to light and especially adapted for their projection or brushing-up on leather or other fibrous material and for the uniform through-dyeing of velvet leather. The dyestuffs are equivalent to the dyestuffs of similar shades from the group of the higher phenylated sulphonated indulines in respect of the through-dyeing, the solidity to striping off and the fastness to light, surpass, however, the same by the fact that even in high-percentage-dyeings the dyeing bath, without being prejudicial to the through-dyeing, is already fully exhausted with very small acid additions.

If the final coupling is effected by means of 2':4'-dichlorobenzoyl-K-acid or p-nitro-benzoyl-H-acid, blue dyestuffs are obtained which are appropriate for the dyeing of leather of the most different kinds of tanning, of cotton, viscose silk or natural silk.

*Example 2*

The operation is the same as in Example 1, however, instead of the N-toluenesulphoyl-1:8-aminonaphthol-3:6-disulphonic acid there is used N-acetyl-1:8-aminonaphthol-3:6-disulphonic acid as end component. A similar, somewhat more reddish dyestuff is obtained, which owing to its somewhat better solubility in acidified baths dyes in a somewhat slower course and is convenient for dyeing leathers of the most different kinds of tanning. If instead of the diazobenzene there is used a sulphonic acid of the diazobenzene, for example the diazobenzene-2:5-disulphonic acid, a dyestuff of the same shade will be obtained, which owing to its still much better solubility in acids and its still higher equalizing power is particularly appropriate for the through-dyeing of velvet-leathers. On the subsequent striping off of the dyed velvet-leathers the dyeings are only slightly cleared up owing to the perfectly uniform penetration of the dyestuff. The dyestuff is particularly applicable for its spraying on leathers from acid bath owing to its high insensibility to acids and to its high solubility in cold baths, whereby deep, dense spray-dyeings without any bronze effect and of good fastness to rubbing are obtained.

If as end component there is used the N-p-toluene-sulphoyl-1:8-aminonaphthol-4-sulphonic acid or the N-p-toluenesulphoyl-2:4-disulphonic acid, dyestuffs are obtained, which yield beautiful blue shades and surpass the fundamental dyestuffs with the corresponding monoacylated end components by their much purer shade and their considerably enhanced fastness to light.

*Example 3*

The dyestuff obtained by acid coupling of 1 molecule of tetrazobenzidine with 1 molecule of 1:8-aminonaphthol-3:6-disulphonic acid, alkaline coupling with 1 molecule of diazobenzene-para-sulphonic acid and alkaline final coupling with 1 molecule of 1:8-aminonaphthol-3:6-disulphonic acid is treated in known manner in soda alkaline solution at 70° C. with phosgene gas up to acid reaction of the solution. By addition of common salt to this acid solution the dyestuff becomes precipitated. The latter is dried by way of suction, mixed with some water, neutralized by means of sodium carbonate and evaporated to dryness. The new dyestuff constitutes a grey bronzing powder very easily soluble in cold water, yields on chrome velvet leather an excellent through-dyeing of greenish-blue shade, which on striping off is only slightly cleared up. In respect of its fastness to light it substantially surpasses the reddish-blue dyestuff not treated with phosgene, which on exposition to light strongly fades to green. Owing to its good solubility in acidified cold baths the dyestuff is particularly suitable for producing dyeings by brushing-on or spraying-on operations.

*Example 4*

To 1 molecule of the intermediate compound obtained by mineral acid coupling of tetrazobenzidine with 1:8-aminonaphthol-3:6-disulphonic acid and alkaline coupling with diazobenzene-parasulphonic acid there is added an alkaline solution of 1 molecule of the condensation product from 1 molecule of cyanuric chloride and 1 molecule of 1:8-amino-naphthol-3:6-disulphonic acid. Thus, a neutral blue dyestuff is obtained which dyes chrome velvet leather thoroughly to such extent that the same appears, even after a strong striping off, beautifully and evenly covered. The dyeing shows a remarkable fastness to light.

If for the final coupling one half of a molecule of the condensation product from 1 molecule of cyanuric chloride and 2 molecules of 1:8-aminonaphthol-3:6-disulphonic acid is used, a dyestuff with similar properties is obtained.

*Example 5*

1 molecule of paranitraniline is diazotized and coupled in mineral acid solution with 1 molecule of 1:8-aminonaphthol-3:6-disulphonic acid. After formation of the intermediate product the same is mixed with an excess of sodium carbonate and afterwards with 1 molecule of diazotized paraaminobenzenesulphonic acid. The nitro group of the resulting diazo dyestuff is reduced to the amino group by addition of the calculated quantity of sodium sulphide at 40–50° C. Then diazotation is effected by introducing the solution of the aminodiazo dyestuff mixed with the calculated quantity of sodium nitrite into diluted hydrochloric acid, the reaction mass is stirred for some time and the acid solution of the diazotized dyestuff is poured into a well cooled alkaline solution of 1 molecule of N-paratoluenesulphoyl-1:8-aminonaphthol-3:6-disulphonic acid. The obtained deep blue dyestuff shows a similar behavior to the benzidine-dyestuff named in Example 1. For the building up of analogous dyestuffs there can be used metanitraniline or nitranilinesulphonic acids instead of the paranitraniline. Likely, the diazobenzeneparasulphonic acid coupled at the second stage can be replaced by its isomers or substitution products or homologues, such as for example metanilic acid, aniline-ortho-sulphonic acid, aniline-2:5-disulphonic acid, paratoluidine- or paraanisidine- or parachloranilinesulphonic acid or naphthionic acid. If instead of the paraaminobenzenesulphonic acid an unsulphonated diazo compound, for example that of the aniline or its homologues, its substitution products or the naphthylamines, is used, there are obtained somewhat more difficultly soluble, in part more reddish dyestuffs, which are less suitable for the through-dyeing, but better suitable for superficial dyeings of leathers.

Instead of the N-paratoluenesulphoyl-1:8-aminonaphthol-3:6-disulphonic acid as end component its corresponding derivatives substituted by carboxylic acid radicals may be used, such as N-acetyl-1:8-aminonaphtholsulphonic acids, N-benzoyl-H-acid, N-naphthenoyl-H-acid, the condensation products from cyanurcarboxylic-acid-chlorides or cyanuric chlorides with aminonaphtholsulphonic acids, etc.

*Example 6*

To 1 molecule of the intermediate product obtained by acid coupling of tetrazobenzidine with 1:8-aminonaphthol-3:6-disulphonic acid and alkaline coupling with diazobenzene-parasulphonic acid there is added a caustic alkaline solution of N-paratoluenesulphoyl-2-amino-5-naphthol-7-sulphonic acid (produced from paratoluenesulphochloride and J-acid in alkaline solution). There is obtained a dark-violet solution, from which after neutralizing of the alkali the dyestuff is salted out. The same dyes leathers tanned by mineral or vegetable agents in blue-violet shades.

*Example 7*

1 molecule of benzidine is tetrazotized and coupled in weakly mineral acid solution with 1 molecule of 1:8-aminonaphthol-3:6-disulphonic acid. After the formation of the intermediate product the same is combined in soda alkaline solution with 1 molecule of diazobenzene-p-sulphonic acid. After coupling to the diazo dyestuff an alkaline solution of about 1 molecule of the monoazo dyestuff obtained by coupling 1 molecule of diazotized 1:8-aminonaphthol-3:6-disulphonic acid in alkaline solution with 1 molecule of N-para-toluene-sulphoyl-1:8-aminonaphthol-3:6-disulphonic acid is allowed to flow into the reaction mass. A deep blue solution is soon formed, from which the new tetrakisazo dyestuff is precipitated by acidification and saturation with common salt. The dyestuff is separated by filtration, mixed for neutralizing purposes with some excess of ammonia and evaporated to dryness, so that a dark, somewhat reddish bronzing powder is obtained, which is very easily soluble in cold water with deep blue coloration.

Chrome leathers or vegetable tanned leathers are very uniformly penetrated by the new dyestuff, thus yielding dyeings on chrome velvet leathers of great fastness to striping-off. The dyeings are pure blue, reddish-free, and of high fastness to light.

If in the manufacture of the dyestuff at the second stage the diazobenzene-p-sulphonic acid is replaced for example by the diazo compound of the metanilic acid, the aniline-o-sulphonic acid, the aniline-2:5-disulphonic acid, the paratoluidine-o-sulphonic acid, the o-anisidine-sulphonic acid, the parachloranilinesulphonic acid, the paranitranilinesulphonic acid, the paraamido-acetanilide-o-sulphonic acid, the naphthionic acid, the $\alpha$- or $\beta$-naphthylamine-sulphonic acids, etc., dyestuffs of similar properties are obtained which yield shades being in part still purer, in part still faster to light and are suitable like the above described dyestuff for the dyeing of leathers or for the dyeing or coloring of water-soluble dressing agents, for the preparation of inks and so on.

If in the manufacture of the dyestuff at the second stage the diazo compound of an unsulphonated amine is used, dyestuffs of somewhat less penetration power are obtained, which are particularly suitable in cases where in preference to a through-dyeing rather a uniform, superficial dyeing of the leathers is desired. It is obvious that in this respect a great variety is given through the use of different monoazo dyestuffs for final coupling. For the preparation of such monoazo dyestuffs it is possible to use as diazo component the most different sulphonated or unsulphonated middle components, such as for example 1:8- or other aminonaphthols or their mono- or disulphonic acids; this diazo component must only fulfil the condition of imparting to the monoazo dyestuff produced therefrom and from the N-acylated aminonaphthol-sulphonic acid the capacity of further coupling.

As N-acylated aminonaphtholsulphonic acids there may be cited those with a sulphonic acid radical as well as those with a carboxylic acid radical or those with the radical of the cyanuric acid. These acid radicals on the N-atom may be introduced before or after the coupling to the monoazo dyestuff or before or after the coupling to the final dyestuff. The final dyestuffs may also be produced in such a way that the intermediate product is first coupled with the middle component to the trisazo dyestuff, whereupon the latter is again diazotized and finally coupled with the acylated aminonaphtholsulphonic acid.

What I claim is:

1. Azo dyestuffs of the general formula

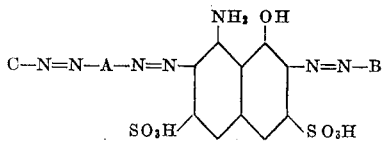

wherein A stands for a radical of the benzene series and the diphenyl series, B stands for a radical of the benzene- and naphthalene-series and C represents an acylaminonaphtholsulphonic acid, said dyestuffs dyeing leather level, blue to violet shades of good fastness properties.

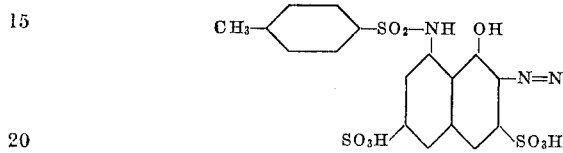

2. Azo dyestuffs of the general formula

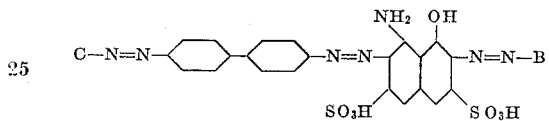

wherein B stands for a radical of the benzene and

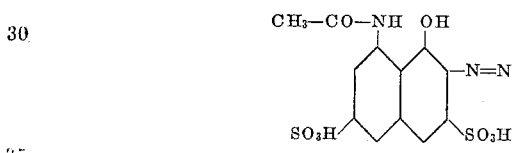

naphthalene series and C represents an acylaminonaphtholsulphonic acid, said dyestuffs dyeing leather level, blue to violet shades of good fastness properties.

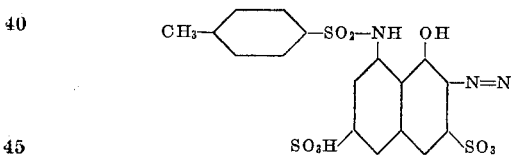

3. Azo dyestuffs of the general formula

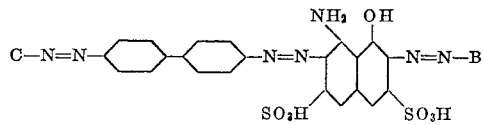

wherein B stands for a sulphonated benzene radical and C stands for an acylaminonaphtholsulphonic acid, said dyestuffs dyeing leather level, blue to violet shades of good fastness properties.

4. The dyestuff having in the free state the formula

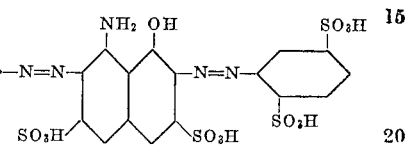

which dyes leather level, blue shades of good fastness properties.

5. The dyestuff having in the free state the formula

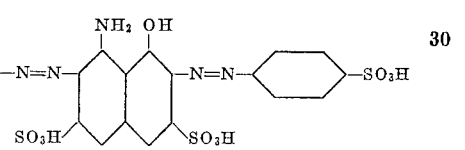

which dyes leather level, blue shades of good fastness properties.

6. The dyestuff having in the free state the formula

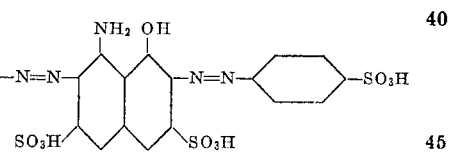

which dyes leather level, blue shades of good fastness properties.

HEINRICH LIER.